United States Patent
Cho et al.

(10) Patent No.: US 7,688,752 B2
(45) Date of Patent: Mar. 30, 2010

(54) SCHEDULING METHOD AND SYSTEM FOR GUARANTEEING REAL-TIME SERVICE QUALITY OF WIBRO CPE

(75) Inventors: Kyu-Ho Cho, Suwon-si (KR); Deung-Hyeon Ryu, Suwon-si (KR); Ki-Young Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 363 days.

(21) Appl. No.: 11/902,336

(22) Filed: Sep. 20, 2007

(65) Prior Publication Data
US 2008/0225742 A1 Sep. 18, 2008

(30) Foreign Application Priority Data
Oct. 27, 2006 (KR) ........................ 10-2006-0105256

(51) Int. Cl.
*H04W 4/00* (2009.01)
(52) U.S. Cl. .................... 370/252; 370/338; 370/412
(58) Field of Classification Search ................ 370/252, 370/338, 352, 412, 468, 395.21, 395.4, 328, 370/329
See application file for complete search history.

(56) References Cited

U.S. PATENT DOCUMENTS

| | | | |
|---|---|---|---|
| 2007/0208854 A1* | 9/2007 | Wiryaman et al. | 709/225 |
| 2007/0258508 A1* | 11/2007 | Werb et al. | 375/140 |
| 2007/0283050 A1* | 12/2007 | Savage | 709/248 |
| 2008/0186909 A1* | 8/2008 | Kim et al. | 370/328 |
| 2009/0147765 A1* | 6/2009 | Chen et al. | 370/345 |

* cited by examiner

*Primary Examiner*—Brian D Nguyen
(74) *Attorney, Agent, or Firm*—H.C. Park & Associates, PLC

(57) ABSTRACT

Provided are a scheduling method and apparatus for guaranteeing real-time service quality of Wireless Broadband (WiBro) customer premises equipment (CPE). The scheduling apparatus includes: a real-time protocol (RTP) packet monitoring unit for monitoring an RTP packet passing through a local area network (LAN) section and detecting a bandwidth of real-time service; and a queue managing unit for determining a window size corresponding to the bandwidth of real-time service checked by the RTP packet monitoring unit and generating/changing a real-time service queue. The scheduling method and apparatus monitor an RTP packet and adjust a real-time service queue, thereby ensuring real-time service quality of terminals.

10 Claims, 3 Drawing Sheets

SCHEDULING METHOD AND SYSTEM FOR GUARANTEEING REAL-TIME SERVICE QUALITY OF WIBRO CPE

CLAIM OF PRIORITY

This application makes reference to, incorporates the same herein, and claims all benefits accruing under 35 U.S.C. §119 from an application for SCHEDULING METHOD AND SYSTEM FOR GUARANTEEING REAL-TIME SERVICE QUALITY OF WIBRO CPE earlier filed in the Korean Intellectual Property Office on 27 Oct. 2006 and there duly assigned Serial No. 2006-0105256.

BACKGROUND OF THE INVENTION

1. Field of the Invention

The present invention relates to a scheduling method and system for guaranteeing real-time service quality of Wireless Broadband (WiBro) customer premises equipment (CPE).

2. Description of the Related Art

WiMAX (World Interoperability for Microwave Access, Inc.) is an organization founded in 2001 that promotes the IEEE 802.16 wireless broadband standard and provides certification for devices for compliant devices. WiMAX is designed to extend local Wi-Fi networks across greater distances such as a campus, as well as to provide last mile connectivity to an ISP or other carrier many miles away. In addition, Mobile WiMAX offers a voice and higher-speed data alternative to the cellular networks.

WiBro (Wireless Broadband) is the South Korean counterpart to Mobile WiMAX. Based on the IEEE 802.16e standard, South Korea leapfrogged the U.S. in long-range Wi-MAX connectivity as two companies launched WiBro in the summer of 2006. The initial services maintained a connection in vehicles moving as fast as 74 miles per hour within one kilometer of the tower.

A conventional terminal having a configuration of customer premises equipment (CPE) uses a single queue without detecting a real-time service channel established between a wide area network (WAN) and a local area network (LAN). Thus, quality of service (QoS) may be affected by change in situation of real-time data traffic and general data traffic.

Meanwhile, a system using a plurality of queues sets the bandwidth of a strict priority queue (SPQ) for a specific Internet protocol (IP)/port for real-time service according to a ratio in which simultaneous channels can be established for the total number of users, etc. However, customer premises equipment (CPE) is a general-purpose terminal rather than a terminal dedicated to real-time service, and thus a plurality of queues cannot be optimized and statically allocated.

Even when real-time service of customer premises equipment (CPE) is predicted, and queues are statically set according to channels, it is difficult to set an accurate bandwidth for each queue because a bandwidth that the queue must ensure is different according to a codec of a channel established between a WAN (wide are network) and a LAN (local area network).

In addition, algorithms, such as strict priority queue (SPQ), weighted round robin (WRR), etc., used in a system in which real-time service and general data service are mixed, give a priority order to queues to set an order of packets to be transmitted, and thus do not relate to ensuring a bandwidth needed for a real-time service channel.

A system using a conventional algorithm, such as strict priority queue (SPQ), weighted round robin (WRR), etc., assumes that a whole bandwidth is always fixed and thus is not appropriate for a bandwidth reservation policy in WiBro customer premises equipment (CPE) in which a bandwidth of a WAN (wide area network), which is a wireless section, changes according to distance from a radio access station (RAS), electric field strength, and surroundings.

Such a conventional customer premises equipment (CPE) has a problem in that it cannot support QoS when a terminal uses real-time service, such as voice over Internet protocol (VoIP), because terminals access the customer premises equipment (CPE) through a LAN (local area network) and perform communication via a WAN (wide area network).

SUMMARY OF THE INVENTION

It is an objective of the present invention to provide a scheduling method and system for guaranteeing real-time service quality of Wireless Broadband (WiBro) customer premises equipment (CPE), monitoring real-time protocol (RTP) packets passing through the WiBro customer premises equipment (CPE), checking whether a channel for real-time service is established between a wide area network (WAN) and a local area network (LAN), generating a queue for the established channel, and thereby ensuring a bandwidth.

It is another objective of the present invention to provide a scheduling method and system for guaranteeing real-time service quality of WiBro customer premises equipment (CPE), appropriately coping with a transmission (Tx) bandwidth of the WiBro customer premises equipment (CPE) that varies according to distance from a radio access station (RAS), electric field strength, and surroundings by analyzing a received signal strength indicator (RSSI) or channel quality indicator (CQI) value, and thereby providing stable quality of service (QoS) to all terminals accessing the WiBro customer premises equipment (CPE).

A first aspect of the present invention provides a scheduling apparatus for guaranteeing real-time service quality of WiBro customer premises equipment (CPE), the scheduling apparatus comprising: an RTP packet monitoring unit for monitoring an RTP packet passing through a local area network (LAN) section and detecting a bandwidth of real-time service; and a queue managing unit for determining a window size corresponding to the bandwidth of real-time service checked by the RTP packet monitoring unit and generating/changing a real-time service queue.

The queue managing unit may determine the window size by Formula 1 below:

$$WS = \frac{BW}{(t_i - t_{i-1})} \quad \text{[Formula 1]}$$

wherein WS denotes packet (window) size, BW denotes bandwidth of a terminal establishing a real-time service channel, $t_i$ denotes current Tx time, and $t_{i-1}$ denotes immediately prior Tx time.

And, the queue managing unit may adjust the window size by Formula 2 below:

$$WScpe = WSbq + WSrtq1 + WSrtq2 + \ldots \quad \text{[Formula 2]}$$

wherein WScpe denotes the total throughput that WiBro customer premises equipment (CPE) can process at the point of current Tx time and varies according to a radio frequency (RF) situation of WiBro and a link environment with a radio access station (RAS), which can be calculated back at an RF receiving end on the basis of a data coding scheme, e.g., quadrature phase shift keying (QPSK), 16 quadrature amplitude modulation (QAM), and 64 QAM. In other words, the more the number of QPSK, the less a throughput becomes, and the more the number of 64 QAM, the more the throughput becomes. Thus, the throughput is estimated by numbering coding schemes per unit time period. While WScpe denotes the total throughput that WiBro customer premises equipment (CPE) can process at the point of current Tx time, and WSbq, WSrtq1, WSrtq2, etc. denote throughputs required by respective data and real-time service queues.

In addition, the RTP packet monitoring unit may request the queue managing unit to change the bandwidth of real-time service when a codec for processing packets is changed, and determine whether or not a queue of real-time service is generated, with reference to the packet's originating address and destination address, and the codec.

A second aspect of the present invention provides a scheduling method for guaranteeing real-time service quality of WiBro customer premises equipment (CPE), the scheduling method comprising the steps of: monitoring, at an RTP packet monitoring unit, an RTP packet passing through a local area network (LAN) section and detecting a bandwidth of real-time service; and determining a window size corresponding to the bandwidth of real-time service checked by the RTP packet monitoring unit and generating/changing a real-time service queue.

In the step of detecting the bandwidth of real-time service, the window size may be determined by Formula 1 below:

$$WS = \frac{BW}{(t_i - t_{i-1})} \quad \text{[Formula 1]}$$

wherein WS denotes packet (window) size, BW denotes bandwidth, $t_i$ denotes current Tx time, and $t_{i-1}$ denotes immediately prior Tx time.

In addition, in the step of detecting the bandwidth of real-time service, the window size may be adjusted by Formula 2 below:

$$WScpe = WSbq + WSrtq1 + WSrtq2 + \ldots \quad \text{[Formula 2]}$$

wherein WScpe is the total throughput that WiBro customer premises equipment (CPE) can process at the point of current Tx time, and WSbq, WSrtq1, WSrtq2, etc. are throughputs required by respective data and real-time service queues.

Meanwhile, the step of detecting the bandwidth of real-time service may further comprise the step of requesting the queue managing unit to change the bandwidth of real-time service when a codec for processing packets is changed, and it may be determined whether or not a queue of real-time service is generated, with reference to the packet's originating address and destination address, and the codec.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, exemplary embodiments of the present invention will be described in detail with reference to the accompanying drawings. In the following description, a detailed description of known functions and configurations incorporated herein has been omitted for conciseness. The following description will be made regarding exemplary embodiments in which the present invention is applied to a scheduling method and system for guaranteeing real-time service quality of Wireless Broadband (WiBro) customer premises equipment (CPE). It should be noted that the following exemplary embodiments are merely to help with understanding the present invention, and thus are not to be interpreted as limiting the scope of the present invention.

Figure 1:
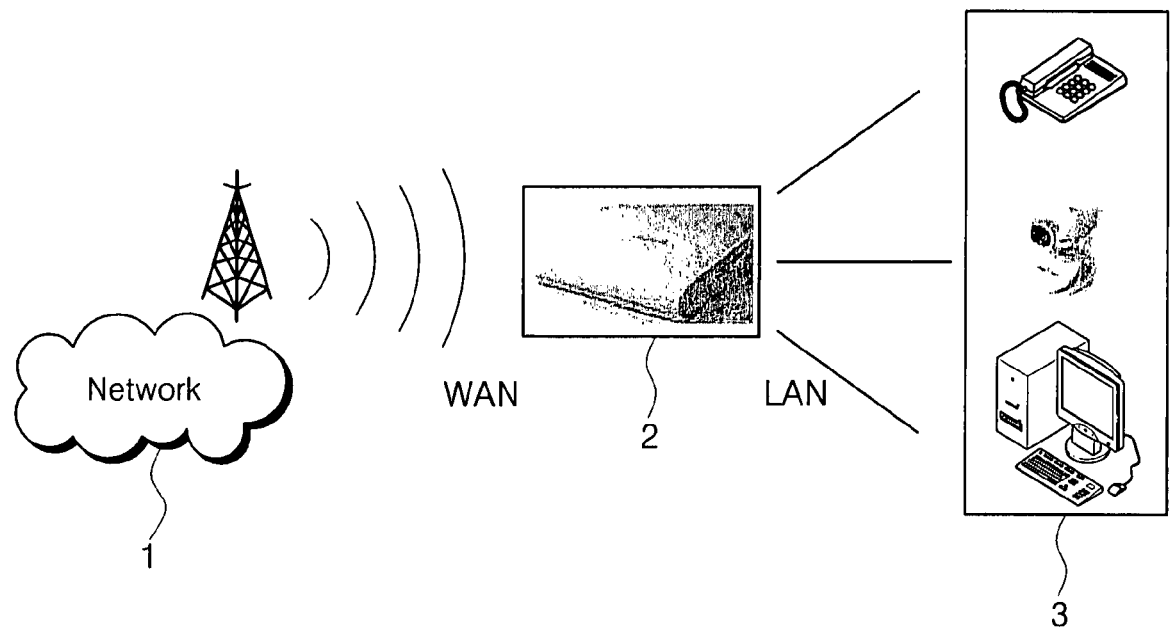
FIG. 1 illustrates the configuration of a network of Wireless Broadband (WiBro) customer premises equipment (CPE) according to the present invention.

FIG. 1 illustrates the configuration of a network of WiBro customer premises equipment (CPE) according to the present invention.

A network of a WiBro customer premises equipment (CPE) 2 comprises a WiBro network 1, the customer premises equipment (CPE) 2, and at least one local area network (LAN) terminal 3.

Figure 2:
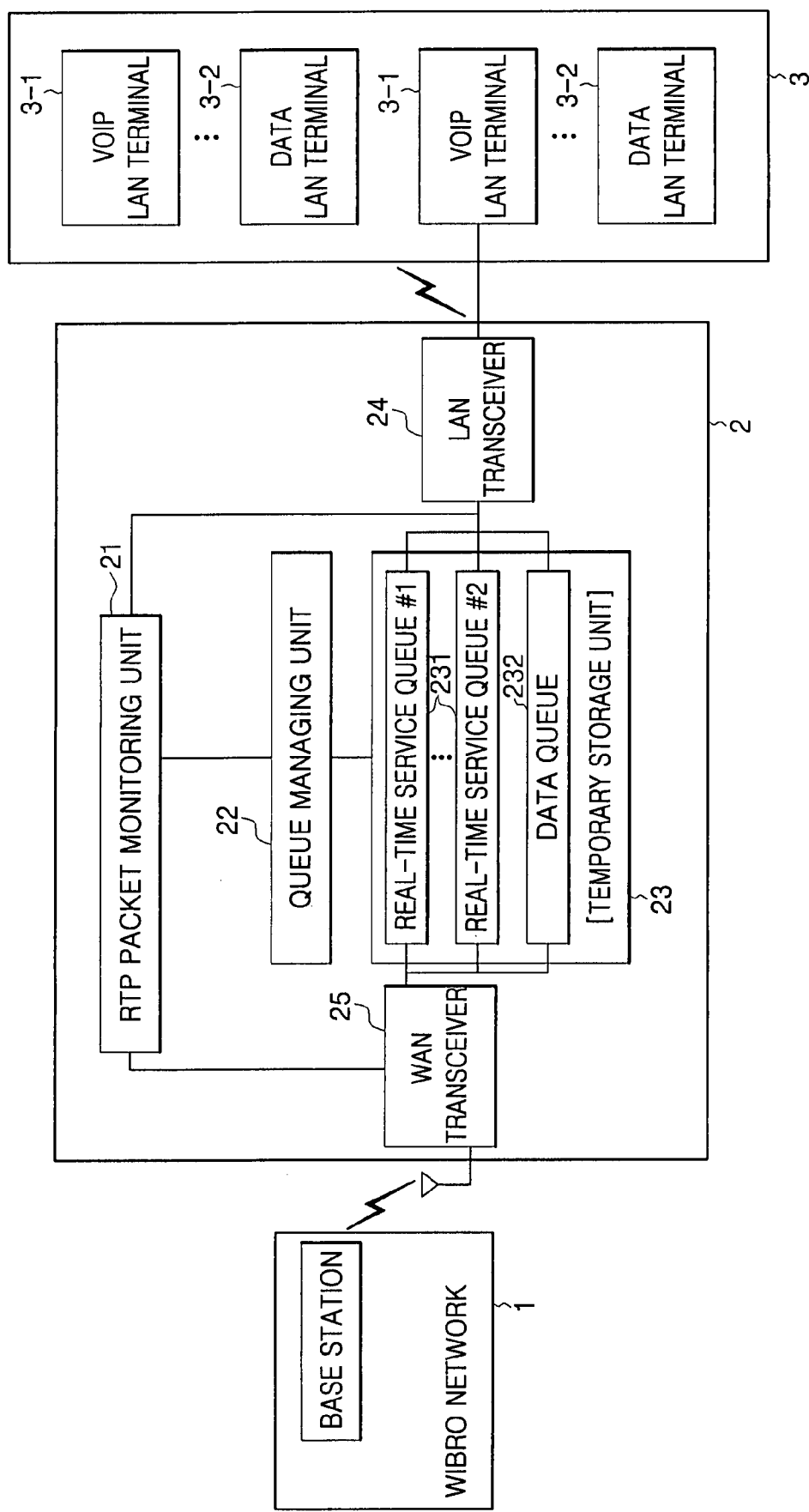
FIG. 2 is a block diagram of a scheduling apparatus for guaranteeing real-time service quality of WiBro customer premises equipment (CPE) according to an exemplary embodiment of the present invention.

Here, the local area network (LAN) terminal 3, as shown in FIG. 2, may be classified into a data local area network (LAN) terminal 3-2 providing data service and a voice over Internet protocol (VoIP) local area network (LAN) terminal 3-1 providing real-time service.

The WiBro network 1 is connected to the CPE 2 through a WiBro radio access station (RAS) and a WAN (wide area network), and the at least one local area network (LAN) terminal 3 is connected to the CPE 2 via a local area network (LAN).

FIG. 2 is a block diagram of a scheduling apparatus for guaranteeing real-time service quality of WiBro customer premises equipment (CPE) according to an exemplary embodiment of the present invention. The scheduling apparatus for guaranteeing quality of real-time service of WiBro customer premises equipment (CPE) comprises a local area network (LAN) transceiver 24 and a WAN (wide area network) transceiver 25 together with a real-time protocol (RTP) packet monitoring unit 21, a queue managing unit 22 and a temporary storage unit 23.

The local area network (LAN) transceiver 24 transmits/receives a packet to/from the at least one local area network (LAN) terminal 3 to perform real-time service and data service.

And, the WAN (wide area network) transceiver 25 transmits/receives a packet to/from the WiBro network 1.

The RTP packet monitoring unit 21 monitors a real-time protocol (RTP) packet passing through a local area network (LAN) section via the local area network (LAN) transceiver 24, thereby detecting the bandwidth of real-time service. Here, when a codec for processing packets is changed, the RTP packet monitoring unit 21 requests the queue managing unit 22 to change the bandwidth of real-time service, and determines whether or not a queue of real-time service is generated, with reference to the packet's originating address and destination address, and the codec.

The queue managing unit 22 determines a window size corresponding to the bandwidth of real-time service checked by the RTP packet monitoring unit 21, and generates/changes a real-time service queue 231. Here, the queue managing unit 22 determines the window size by Formula 1 below:

$$WS = \frac{BW}{(t_i - t_{i-1})} \quad \text{[Formula 1]}$$

wherein WS denotes packet (window) size, BW denotes bandwidth of a terminal establishing a real-time service channel, $t_i$ denotes current transmission (Tx) time, and $t_{i-1}$ denotes immediately prior Tx time.

And, the queue managing unit 22 adjusts the window size by Formula 2 below:

$$WScpe = WSbq + WSrtq1 + WSrtq2 + \ldots \quad \text{[Formula 2]}$$

wherein WScpe denotes the total throughput that WiBro customer premises equipment (CPE) can process at the point of current transmission (Tx) time, and WSbq, WSrtq1, WSrtq2, etc. denote throughputs that respective data and real-time service queues require.

General functions and detailed operation of the above mentioned components will be omitted, and operation corresponding to the present invention will be described below.

First, the RTP packet monitoring unit 21 monitors an RTP packet passing through the local area network (LAN) section via the local area network (LAN) transceiver 24, thereby detecting the bandwidth of real-time service of the corresponding VoIP local area network (LAN) terminals 3-1. Here, the bandwidth of real-time service monitored by the RTP packet monitoring unit 21 denotes the bandwidth between the VoIP local area network (LAN) terminals 3-1 receiving the real-time service. In other words, the VoIP local area network (LAN) terminal 3-1 predetermines how large a bandwidth it will perform real-time communication through with the counterpart VoIP local area network (LAN) terminal 3-1. Thus, the RTP packet monitoring unit 21 checks the bandwidth between the VoIP local area network (LAN) terminals 3-1 performing real-time communication and, to this end, may check that a real-time service channel is generated, with reference to the packet's originating address and destination address, and a codec.

When it is checked as described above by the RTP packet monitoring unit 21 that the real-time service channel is generated, and the bandwidth is checked, the queue managing unit 22 determines a packet (window) size corresponding to the bandwidth and generates the real-time service queue 231. Here, the temporary storage unit 23 comprises at least one real-time service queue 231 corresponding to the real-time service channel and a data queue 232.

Meanwhile, when the bandwidth of the WAN (wide area network) that is a WiBro network section is changed, the WAN (wide area network) transceiver 25 and the queue managing unit 22 adjust the real-time service queue 231 and the data queue 232 with reference to Formula 2. More specifically, when the bandwidth of the WAN (wide area network) is larger than the total bandwidth of the terminals 3 connected to the local area network (LAN), the real-time service queue 231 and the data queue 232 all generated by the queue managing unit 22 are used.

On the other hand, when the bandwidth of the WAN (wide area network) is smaller than the total bandwidth of the terminals 3 connected to the local area network (LAN), the queue managing unit 22 changes the bandwidth of the data queue 232 into the minimum threshold value and maintains the real-time service queue 231. Here, the minimum threshold value is regulated by a manager.

Figure 3:
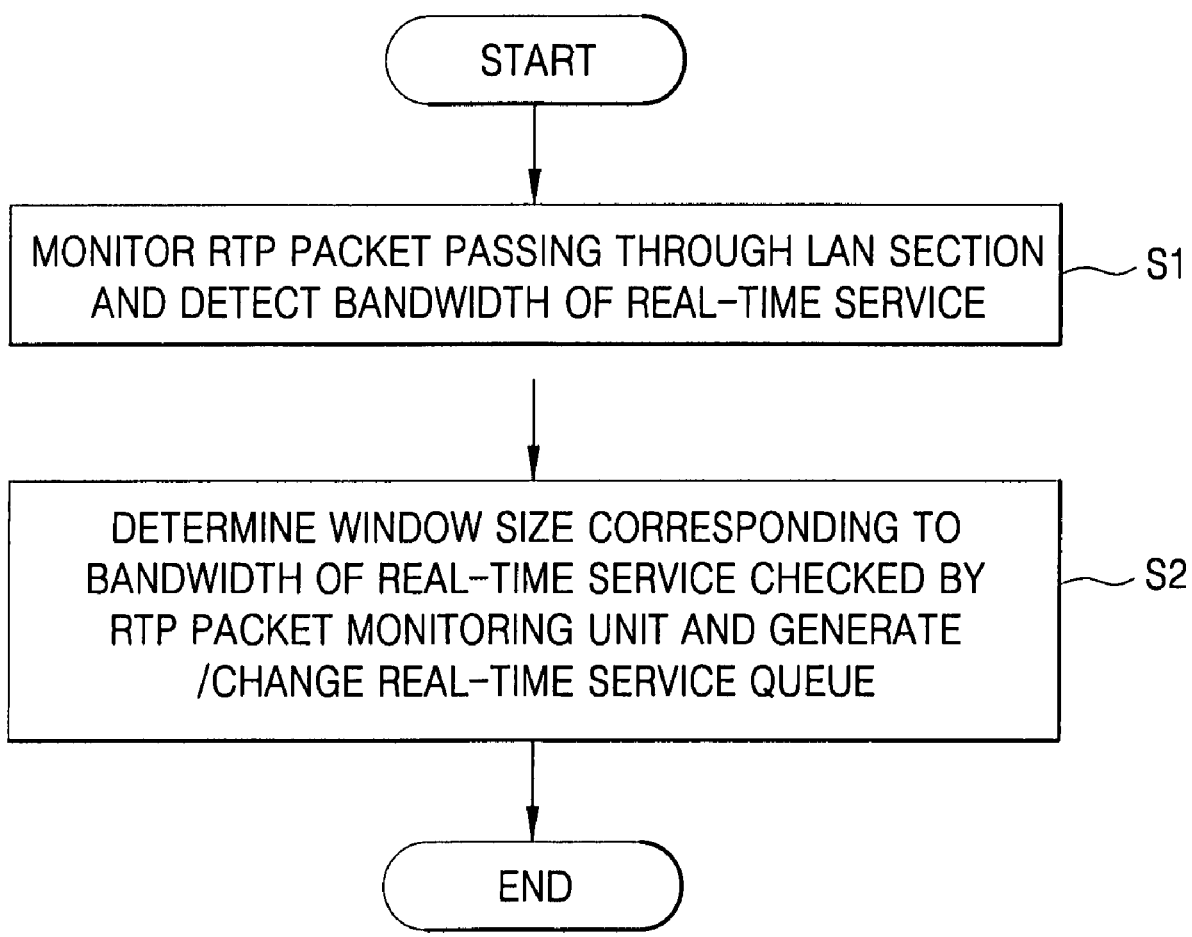
FIG. 3 is a flowchart showing a scheduling method for guaranteeing real-time service quality of WiBro customer premises equipment (CPE) according to an exemplary embodiment of the present invention.

A scheduling method for guaranteeing real-time service quality of WiBro customer premises equipment (CPE) constituted as described above according to an exemplary embodiment of the present invention will be described below with reference to FIG. 3.

First, an RTP (real-time protocol) packet passing through a local area network (LAN) section is monitored, and the bandwidth of real-time service is detected (S1). The step of detecting the bandwidth of real-time service further comprises a step of requesting the queue managing unit 22 to change the bandwidth of real-time service when a codec for processing packets is changed. And, it is determined whether or not a real-time service queue is generated, with reference to the packet's originating address and destination address, and a codec.

Here, in the step of detecting the bandwidth of real-time service (S1), a window size is determined by Formula 1 below.

$$WS = \frac{BW}{(t_i - t_{i-1})} \quad \text{[Formula 1]}$$

wherein WS denotes packet (window) size, BW denotes bandwidth, $t_i$ denotes current Tx time, and $t_{i-1}$ denotes immediately prior Tx time.

Subsequently, a window size corresponding to the bandwidth of real-time service checked by the RTP packet monitoring unit 21 is determined, and the real-time service queue 231 is generated/changed (S2). In the step of detecting the bandwidth of real-time service (S1), the window size is adjusted by Formula 2 below.

$$WScpe = WSbq + WSrtq1 + WSrtq2 + \ldots \quad \text{[Formula 2]}$$

WScpe denotes the total throughput that WiBro customer premises equipment (CPE) can process at the point of current Tx time, and WSbq, WSrtq1, WSrtq2, etc. denote throughputs required by the respective data and real-time service queues 231 and 232.

As described above, according to the scheduling method and apparatus for guaranteeing real-time service quality of WiBro customer premises equipment (CPE), it is possible to ensure the real-time service quality of terminals by monitoring an RTP (real time protocol) packet and adjusting a real-time service queue.

While the present invention has been described with reference to exemplary embodiments thereof, it will be understood by those skilled in the art that various changes in from and detail may be made therein without departing from the scope of the present invention as defined by the following claims.

What is claimed is:

1. A scheduling apparatus for guaranteeing real-time service quality of Wireless Broadband (WiBro) customer premises equipment (CPE), the scheduling apparatus comprising:

a real-time protocol (RTP) packet monitoring unit for monitoring a real-time protocol (RTP) packet passing through a local area network (LAN) section and detecting a bandwidth of real-time service; and a queue managing unit for determining a window size corresponding to the bandwidth of real-time service checked by the real-time protocol (RTP) packet monitoring unit and generating or changing a real-time service queue.

2. The scheduling apparatus of claim 1, wherein the queue managing unit determines the window size by the following formula:

$$WS = \frac{BW}{(t_i - t_{i-1})}$$

wherein WS denotes packet size, BW denotes bandwidth of a terminal establishing a real-time service channel, $t_i$ denotes current transmission (Tx) time, and $t_{i-1}$ denotes immediately prior Tx time.

3. The scheduling apparatus of claim 1, wherein the queue managing unit adjusts the window size by the following formula:

$$WScpe = WSbq + WSrtq1 + WSrtq2 + \ldots$$

wherein WScpe denotes the total throughput that WiBro customer premises equipment (CPE) can process at the point of current transmission (Tx) time, and WSbq, WSrtq1 and WSrtq2 denote throughputs required by respective data and real-time service queues.

4. The scheduling apparatus of claim 1, wherein when a codec for processing packets is changed, the real-time protocol (RTP) packet monitoring unit requests the queue managing unit to change the bandwidth of real-time service.

5. The scheduling apparatus of claim 4, wherein the real-time protocol (RTP) packet monitoring unit determines whether or not a real-time service queue is generated, with reference to the packet's originating address and destination address, and the codec.

6. A scheduling method for guaranteeing real-time service quality of Wireless Broadband (WiBro) customer premises equipment (CPE), the scheduling method comprising the steps of:
monitoring, at a real-time protocol (RTP) packet monitoring unit, a real-time protocol (RTP) packet passing through a local area network (LAN) section and detecting a bandwidth of real-time service; and
determining a window size corresponding to the bandwidth of real-time service checked by the real-time protocol (RTP) packet monitoring unit and generating or changing a real-time service queue.

7. The scheduling method of claim 6, wherein in the step of detecting the bandwidth of real-time service, the window size is determined by the following formula:

$$WS = \frac{BW}{(t_i - t_{i-1})}$$

wherein WS denotes packet size, BW denotes bandwidth, $t_i$ denotes current transmission (Tx) time, and $t_{i-1}$ denotes immediately prior Tx time.

8. The scheduling method of claim 6, wherein in the step of detecting the bandwidth of real-time service, the window size is adjusted by the following formula:

$$WScpe = WSbq + WSrtq1 + WSrtq2 + \ldots$$

wherein WScpe denotes the total throughput that WiBro customer premises equipment (CPE) can process at the point of current transmission (Tx) time, and WSbq, WSrtq1 and WSrtq2 denote throughputs required by respective data and real-time service queues.

9. The scheduling method of claim 6, wherein the step of detecting the bandwidth of real-time service further comprises the step of:
requesting the queue managing unit to change the bandwidth of real-time service when a codec for processing packets is changed.

10. The scheduling method of claim 9, wherein in the step of detecting the bandwidth of real-time service, it is determined whether or not a queue of real-time service is generated, with reference to the packet's originating address and destination address, and the codec.

* * * * *